United States Patent
Peer

(10) Patent No.: US 11,618,333 B2
(45) Date of Patent: Apr. 4, 2023

(54) METHOD FOR OPERATING AN ELECTRICAL CHARGING DEVICE AND DRIVING RECOMMENDATION FOR AN ELECTRICALLY DRIVEABLE MOTOR VEHICLE AND ELECTRIC CHARGING DEVICE AND MOTOR VEHICLE

(71) Applicant: AUDI AG, Ingolstadt (DE)

(72) Inventor: Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 373 days.

(21) Appl. No.: 16/638,584

(22) PCT Filed: Aug. 9, 2018

(86) PCT No.: PCT/EP2018/071612
§ 371 (c)(1),
(2) Date: Feb. 12, 2020

(87) PCT Pub. No.: WO2019/052749
PCT Pub. Date: Mar. 21, 2019

(65) Prior Publication Data
US 2020/0215928 A1    Jul. 9, 2020

(30) Foreign Application Priority Data

Sep. 13, 2017 (DE) ............. 10 2017 216 126.4

(51) Int. Cl.
*B60L 53/38* (2019.01)
*H02J 50/90* (2016.01)
(Continued)

(52) U.S. Cl.
CPC .............. *B60L 53/38* (2019.02); *B60K 35/00* (2013.01); *B60L 53/31* (2019.02); *B60L 53/36* (2019.02);
(Continued)

(58) Field of Classification Search
CPC .......... B60L 53/38; B60L 53/31; B60L 53/36; B60L 53/66; B60L 2240/12;
(Continued)

(56) References Cited

U.S. PATENT DOCUMENTS

2011/0313647 A1\* 12/2011 Koebler ............ B60W 50/0097
701/123
2015/0094957 A1    4/2015 Hyde et al.
(Continued)

FOREIGN PATENT DOCUMENTS

CN          102910167 A      2/2013
DE        202009000259 U1    3/2009
(Continued)

OTHER PUBLICATIONS

English translation of Kronewitter et al. (WO 2015051876) (Year: 2015).*

(Continued)

*Primary Examiner* — James M McPherson
*Assistant Examiner* — Kyle J Kingsland
(74) *Attorney, Agent, or Firm* — Maier & Maier, PLLC

(57) ABSTRACT

A method for operating an electric charging device for an electrically drivable motor vehicle. The electric charging device has a ground unit for positioning in the ground and for generating an alternating magnetic field for an electric charging operation. The method includes sensing a motor vehicle within a predefined perimeter surrounding the ground unit; sensing a driving parameter value of at least one driving parameter of the sensed motor vehicle at at least one respective predefinable point in time; storing the at least one driving parameter value if an electric charging operation is carried out for the detected motor vehicle; determining a driving recommendation on the basis of the at least one sensed and stored driving parameter value; and transmitting (Continued)

the driving recommendation if another motor vehicle is sensed within the predefined perimeter surrounding the ground unit.

12 Claims, 1 Drawing Sheet

(51) Int. Cl.

| | | |
|---|---|---|
| *H02J 50/10* | (2016.01) | |
| *B60L 53/66* | (2019.01) | |
| *B60L 53/36* | (2019.01) | |
| *B60L 53/31* | (2019.01) | |
| *B60K 35/00* | (2006.01) | |
| *B60L 53/60* | (2019.01) | |

(52) U.S. Cl.
CPC .............. *B60L 53/60* (2019.02); *B60L 53/66* (2019.02); *H02J 50/10* (2016.02); *H02J 50/90* (2016.02); *B60K 2370/152* (2019.05); *B60K 2370/172* (2019.05); *B60L 2240/12* (2013.01); *B60L 2240/14* (2013.01); *B60L 2240/24* (2013.01); *B60L 2240/62* (2013.01); *B60L 2250/16* (2013.01); *Y02T 90/12* (2013.01)

(58) Field of Classification Search
CPC ............. B60L 2240/14; B60L 2240/24; B60L 2240/62; B60L 2250/16; B60L 53/60; B60K 35/00; B60K 2370/152; B60K 2370/172; H02J 50/10; H02J 50/90; Y02T 90/12
See application file for complete search history.

(56) References Cited

U.S. PATENT DOCUMENTS

| | | | | |
|---|---|---|---|---|
| 2015/0298565 A1* | 10/2015 | Iwamura | ............ | G06Q 10/0631 701/22 |
| 2015/0345972 A1* | 12/2015 | Saito | ...................... | G01C 21/36 701/521 |
| 2017/0010116 A1* | 1/2017 | Inoue | ..................... | B60L 53/67 |
| 2018/0072345 A1* | 3/2018 | Nicodemus | ........ | B62D 15/0285 |

FOREIGN PATENT DOCUMENTS

| | | | |
|---|---|---|---|
| DE | 102012004347 A1 | 9/2013 | |
| DE | 102012223057 A1 | 6/2014 | |
| DE | 102013207906 A1 | 10/2014 | |
| DE | 102014223237 A1 | 5/2016 | |
| EP | 2712762 A1 | 4/2014 | |
| EP | 2905170 A1 | 8/2015 | |
| EP | 3028892 A1 | 6/2016 | |
| GB | 2543093 A * | 4/2017 | .............. B60L 53/12 |
| WO | 2015051876 A1 | 4/2015 | |
| WO | WO-2015051876 A1 * | 4/2015 | ............ B60L 11/182 |

OTHER PUBLICATIONS

English translation of Heigele et al. (DE 102012223057) (Year: 2014).*
Banner "Shopping Center Directs Visitors to Available Parking Using Banner Wireless", Mar. 5, 2015 (Year: 2015).*
German Examination Report dated Jun. 19, 2018 in corresponding German Application No. 10 2017 216 126.4; 24 pages; Machine translation attached.
International Search Report dated Nov. 27, 2018 and Written Opinion in corresponding International Application No. PCT/EP2018/071612; 20 pages; Machine translation attached.
Bosch. "Connected and automated parking solutions by Bosch" Sep. 9, 2017 (Sep. 9, 2017) Retrieved from the Internet: https://web.archive.org/web/20170909131523/http://www.bosch-mobility-solutions.com:80/en/highlights/connected-mobility/connected-and-automated-parking/, 10 pgs.
Notification of Transmittal of Copies of Translation of the International Preliminary Report on Patentability dated Mar. 26, 2020, in connection with corresponding international Application No. PCT/EP2018/071612 (8 pgs.).
Office Action dated Nov. 3, 2022, in corresponding Chinese Application No. 201880058822.1, 18 pages.

* cited by examiner

METHOD FOR OPERATING AN ELECTRICAL CHARGING DEVICE AND DRIVING RECOMMENDATION FOR AN ELECTRICALLY DRIVEABLE MOTOR VEHICLE AND ELECTRIC CHARGING DEVICE AND MOTOR VEHICLE

FIELD

The present disclosure relates to a method for operating an electric charging device for an electrically drivable motor vehicle. The charging device has a ground unit in which, for example, a primary coil for generating a magnetic field for an inductive charging operation can be provided. The ground unit can be recessed into a garage floor or a road, for example. The disclosure also includes an electric charging device and a motor vehicle having an electric power storage device.

BACKGROUND

An electric charging device enables wireless charging of an electric traction battery of an electrically drivable motor vehicle. The energy is transmitted inductively, for example, for which purpose a stationary ground unit on the ground cooperates with a mobile charging unit in the motor vehicle. To enable an effective transmission of energy between the two units, it is necessary in particular for the two units to be positioned correctly in relation to one another. To accomplish this, the motor vehicle must be parked in the correct position with the mobile charging unit in position above the ground unit. For this reason, in most cases driving the vehicle onto the ground unit is difficult. Under certain circumstances, it may be very difficult for the driver of a motor vehicle to determine how best to steer his motor vehicle up to the ground unit.

To this end, DE 10 2013 207 906 A1 proposes capturing the area surrounding the motor vehicle using a camera on the motor vehicle. A control unit of the motor vehicle compares the image data recorded by the camera with reference data, which include information about at least one predefined reference object. The predefined reference object can thus be detected in the image data from the camera. This enables the relative position of the mobile charging unit relative to the ground unit to be determined.

DE 10 2014 223 237 A1 describes an inductive charging system in which the charging device has a stationary optical marking element. The motor vehicle detects the optical marking element in the area surrounding the motor vehicle by means of a camera and an image processing device and displays the optical marking element on a display device of the motor vehicle.

EP 2 712 762 A1 describes a positioning system for positioning a vehicle for an inductive charging process. A camera records the vehicle while said vehicle is being positioned. This makes it possible to determine whether and to what extent the actual position of the vehicle deviates from a target position required for inductive charging and to display this extent of deviation to a driver.

Although the above-described methods assist in the process of parking the motor vehicle properly above the ground unit by displaying the position of the motor vehicle in relation to the ground unit, the driver of the motor vehicle can also lose time in this process by correcting the course of his driving. Under certain circumstances, it may already be too late for an effective, rapid parking process and the current position of the motor vehicle may need to be completely corrected. In addition, the methods described above require a sensor system integral to the vehicle and configured to detect the ground unit. Motor vehicles that are already in use would first have to be retrofitted with this sensor system in a complex and costly process.

SUMMARY

The object of the present disclosure is to develop a system and a method for providing a motor vehicle with useful assistance in driving onto a ground unit of an electric charging device, in a particularly cost-effective and simple manner.

This object is achieved by the subjects of the independent claims. Advantageous refinements of the disclosure are disclosed by the dependent claims, the following description, and the figures.

The present disclosure is based on the insight that, for driving a motor vehicle onto a ground unit of an electric charging device, the motor vehicle should be provided early in the process with a suggestion of the optimum way the motor vehicle should be driven in order to position itself correctly above the ground unit with few corrective maneuvers. When the mobile charging unit of a motor vehicle and the ground unit are positioned correctly relative to one another, an electric power storage device of the motor vehicle can be charged particularly effectively.

The method according to the disclosure for operating the electric charging device provides that the steps listed below are carried out by the electric charging device. First, the electric charging device senses a motor vehicle within a predefined perimeter surrounding the ground unit of the electric charging device. For this purpose, the electric charging device can comprise its own sensor system, which detects the approach of a motor vehicle in the predefined perimeter surrounding the ground unit. For the motor vehicle sensed within the predefined perimeter surrounding the ground unit, the electric charging device also sense a driving parameter value for at least one driving parameter at at least one predefinable point in time. The driving parameter may describe the driving behavior of the motor vehicle. In other words, the driving parameter can be used to determine how the motor vehicle drives up to the ground unit of the electric charging device. The electric charging device can sense and/or determine an associated driving parameter value for one predefinable driving parameter or for each of a plurality of predefinable driving parameters. However, the electric charging device can also sense and/or determine the driving parameter value for a specific driving parameter multiple times, for example at regular time intervals or at predetermined intervals between the ground unit and the sensed motor vehicle.

The at least one driving parameter value determined in this way is then stored by the electric charging device if an electric charging operation is carried out for the sensed motor vehicle. For this purpose, the electric charging device has a memory, for example. If no electric charging operation is carried out for the sensed motor vehicle by the time a predetermined time interval following the first sensing of the vehicle within the predefined perimeter has elapsed, the at least one sensed driving parameter value can be discarded. For this purpose, the electric charging device has a buffer memory, for example, which initially stores each sensed driving parameter value temporarily. Then, if the electric charging device detects that the motor vehicle is undergoing an electric charging operation, the at least one driving parameter value associated with the motor vehicle can be moved from the buffer memory and stored in the memory. Otherwise, the driving parameter values stored in the buffer memory can be deleted once the predetermined time interval has elapsed.

Based on the at least one stored driving parameter value of the at least one driving parameter, the electric charging device determines a driving recommendation, which is then transmitted by the electric charging device if another motor vehicle is sensed within the predefined perimeter surrounding the ground unit. The electric charging device is configured as an inductive charging device, for example. The ground unit of the inductive charging device has a charging coil that can transmit electric energy to another charging coil of a motor vehicle. The driving recommendation can provide assistance and/or support for the additional motor vehicle that a driver of the additional motor vehicle or a driver assistance system of said motor vehicle can use to move particularly rapidly and with few corrective maneuvers toward the ground unit of the inductive charging device and can park there with the two charging coils in the correct position for inductive charging of the motor vehicle. The driving recommendation passes the sensed driving parameter value of at least one driving parameter on to the additional motor vehicle in the simplest manner. The sensed driving parameter may correspond, for example, to a steering angle with which the sensed motor vehicle drives toward the ground unit of the electric charging device. This steering angle can then be communicated by means of the driving recommendation to each additional motor vehicle sensed. This enables the driver of the additional motor vehicle to choose a steering angle early on that will promise a successful approach toward the ground unit.

However, the driving recommendation may also be composed of multiple driving parameters, and/or a single driving parameter value for a specific driving parameter may be selected from the individual driving parameter values, which reflects the best possible approach to the ground unit. The driving recommendation may also be a combination of multiple driving parameters; for example, the driving recommendation may describe the best possible route for approaching the ground unit, with the approach route being determined from a plurality of sensed driving parameters such as a sensed driving direction and/or a sensed steering angle and/or a sensed driving speed.

The method according to the disclosure offers the advantage that the electric charging device can provide information regarding the best way for driving a motor vehicle onto the ground unit of the electric charging device in order to be electrically charged as efficiently as possible. Based on the history, for example, of a plurality of motor vehicles that have already been driven onto the ground unit, the electric charging device can transmit a particularly useful and promising driving recommendation, since the driving recommendation is based on actual approach routes that have already been traveled. The driver of a motor vehicle can use the driving recommendation to perform steering maneuvers early on, for example, that will lead to an optimal end position of the motor vehicle on the ground unit. This eliminates the need for corrective maneuvers, thereby speeding up the entire process of charging the motor vehicle, including driving onto the ground unit. Thus, the electric charging device can serve more motor vehicles in succession within a predetermined time interval than if each driver must first determine his own optimal approach route to the end position above the ground unit, in addition to the charging process.

Another advantage is that the driving recommendation is decoupled from a sensor system integral to the vehicle. This eliminates the complex and costly process of equipping motor vehicles with this type of sensor system. In addition, less memory space is required overall, since in the simplest case the electric charging device only has to store a single driving recommendation, while a motor vehicle might have to store a driving recommendation for each of a plurality of charging devices in order to adapt to structural differences between the individual charging devices.

The disclosure also comprises refinements of the method according to the disclosure that result in additional advantages.

One advantageous embodiment provides that the electric charging device senses respective driving parameter values at at least one respective predefinable point in time for a plurality of motor vehicles sensed within the predefined perimeter surrounding the ground unit, and saves said values if the electric charging device carries out an electric charging operation for the motor vehicle in question. The electric charging device further determines the driving recommendation by selecting one driving parameter value for each driving parameter from the driving parameter values sensed and stored for the plurality of motor vehicles. The transmitted driving recommendation then comprises the selected driving parameter value for each driving parameter. The driving recommendation may not be based solely on the driving behavior of a single motor vehicle, and may instead correspond to a combination of the respective driving behaviors of multiple motor vehicles. Thus, the electric charging device may determine from a plurality of sensed approach routes, for example, the best possible approach route, which corresponds, for example, to a combination of a driving speed of a first motor vehicle and a steering angle of a second motor vehicle. Determining the driving recommendation from a plurality of driving behaviors of respective motor vehicles increases the probability that the determined driving recommendation will approximate a theoretically ideal driving recommendation. Additionally, a statistical analysis of the plurality of stored driving parameter values may be carried out, likewise increasing the probability that an approach to the ground unit of the electric charging device taking the driving recommendation into consideration will be successful.

A further advantageous embodiment provides that the electric charging device determines an interval of time between sensing of the motor vehicle within the predefined perimeter surrounding the ground unit and the start of the electric charging operation. The predefined criterion for selecting one of the stored driving parameter values then includes the requirement that this determined time interval must be shorter than a predefined maximum time interval. In other words, only those driving recommendations that correspond to a rapid approach by a motor vehicle from a boundary edge of the predefined perimeter to the correct end position above the ground unit are determined. This ensures that slow approach routes that exceed the predefined maximum time interval are excluded from a possible driving recommendation, since such approach routes may point to difficulties and/or multiple corrective maneuvers when driving onto the ground unit.

Another advantageous embodiment provides that the driving parameter values of the different motor vehicles are averaged. This averaging can be performed using different weightings. For example, once its respective driving parameter values have been stored, each sensed motor vehicle is assigned a weighting that values the approach route traveled by the motor vehicle in driving onto the ground unit. For example, the amount of time required by the motor vehicle to travel this approach route is assessed and a correspondingly high weighting is assigned if the amount of time is small, and a correspondingly lower weighting is assigned if the amount of time is large. Thus, the weighting is an indication of the quality of the respective recorded approach routes. The driving recommendation then comprises a driving parameter value averaged from the stored driving parameter values for a respective driving parameter. This results in the further advantage that the best possible driving recommendation is determined and transmitted even if, statistically speaking, driving parameter values were sensed and stored by the electric charging device for only a small number of motor vehicles. The weighted averaging enables a theoretically ideal driving parameter value to be determined from the stored driving parameter values.

A further advantageous embodiment provides that the electric charging device senses the at least one driving parameter value for the at least one sensed motor vehicle at a plurality of predefinable times. Then, in determining a driving recommendation from the plurality of sensed and stored driving parameter values for a respective driving parameter, an approach trajectory of the respective sensed motor vehicle is first determined, said approach trajectory describing a travel path of the motor vehicle from a starting position sensed within the predefined perimeter surrounding the ground unit to an end position of the motor vehicle suitable for the electric charging operation. The approach trajectories for each of a plurality of motor vehicles can be stored in the memory of the electric charging device. A suitable approach trajectory for the driving recommendation can then be selected from the stored approach trajectories. Alternatively, the stored approach trajectories can be averaged as described above, in order to determine an ideal approach trajectory. The driving recommendation with the selected or determined approach trajectory is then transmitted by the electric charging device. A driver of another motor vehicle can then use this recommended approach trajectory as orientation for driving onto the ground unit of the electric charging device. However, a driver assistance system that carries out an automatic parking process for the motor vehicle, for example, can also control the motor vehicle such that the transmitted and recommended approach trajectory is traveled. The determination and transmission of the recommended approach trajectory makes another motor vehicle's approach onto the ground unit of the electric charging device particularly easy.

A further advantageous embodiment provides that a radius of the predefined area within which a motor vehicle is sensed by the electric charging device is greater than two meters. Alternatively or additionally, the predefined perimeter may be selected such that it includes an entire charging station, for example. The charging station can comprise, for example, multiple electric charging devices as well as an entrance and/or an exit. The charging station may be configured similarly to a gas station, for example, with multiple entrances and exits, a checkout area, and a charging area. In that case, the predefined perimeter is selected such that the boundaries of the predefined perimeter extend to a boundary edge of the charging station. This ensures that the greatest possible approach route by a motor vehicle to the ground unit of the electric charging device is sensed. Other motor vehicles merely driving past the charging station on the road, for example, are not sensed.

A further advantageous embodiment provides that the electric charging device senses the motor vehicle and/or the driving parameter value by means of a sensor system integral to the charging device. For example, the ground unit of the electric charging device comprises sensors that detect the position of a motor vehicle relative to the residential unit. For this purpose, in the case of an inductive charging device, for example, the charging coil of the ground unit can be used as such a sensor. Based on the strength and alignment of an electromagnetic field, said charging coil can detect where the charging coil of the motor vehicle is located relative to the charging coil of the ground unit. This results in the advantage that the electric charging device can be produced particularly cost-effectively.

A further advantageous embodiment provides that the at least one driving parameter sensed by the electric charging device relates to one of the following driving parameters: a driving speed, a steering angle, an acceleration, a braking, a driving direction of the respective motor vehicle, and/or a position of the respective motor vehicle relative to the ground unit. Thus, these driving parameters can be used to determine and output useful recommendations for an optimum approach to the ground unit for another motor vehicle.

The electric charging device according to the disclosure for an electrically drivable motor vehicle has a ground unit for positioning in the ground and for generating an alternating magnetic field for an electric charging operation. The electric charging device further has a sensing device that is configured to sense a motor vehicle within a predefined perimeter surrounding the ground unit. The sensing device is configured to sense a driving parameter value of at least one driving parameter of the sensed motor vehicle at at least one respective predefinable point in time. The electric charging device further has a memory unit. The electric charging device is configured to detect an electric charging operation for the detected motor vehicle and, if the electric charging operation is detected, to store the at least one sensed driving parameter value in the memory unit.

The electric charging device further has a processor unit, which is configured to determine a driving recommendation on the basis of the at least one sensed driving parameter value that is stored in the memory unit. The electric charging device is configured to transmit the driving recommendation if the sensing device detects an additional motor vehicle within the predefined perimeter surrounding the ground unit.

The advantages and refinements described above in connection with the method according to the disclosure for operating an electric charging device apply, mutatis mutandis, to the electric charging device according to the disclosure.

The motor vehicle according to the disclosure has an electric power storage device, configured to be charged by means of an electric charging operation. The motor vehicle is configured to receive a driving recommendation from an electric charging device according to the disclosure and to display the driving recommendation on a display device of the motor vehicle. The display device may be configured, for example, as a screen arranged inside the motor vehicle. The display device may be configured as a navigation device and/or as an infotainment system, for example. The approach trajectory recommended by the electric charging device can be displayed on the display device together with the current position of the motor vehicle relative to the approach trajectory, for example.

The advantages and refinements described above in connection with the method according to the disclosure for operating an electric charging device and in connection with the electric charging device according to the disclosure apply, mutatis mutandis, to the motor vehicle according to the disclosure.

BRIEF DESCRIPTION OF THE DRAWING

Exemplary embodiments of the disclosure will be described below. In reference to these embodiments.

DETAILED DESCRIPTION

The exemplary embodiments described in the following are preferred embodiments of the disclosure. In the exemplary embodiments, the described components of the embodiments are each individual features of the disclosure that are to be considered independently of one another, and also each refine the disclosure independently of one another and for that reason as well should be regarded individually or in a combination other than the one shown as part of the disclosure. The described embodiments can also be supplemented by other features of the disclosure that have already been described.

In the figures, elements having the same function are provided in each case with the same reference symbols.

Figure 1:
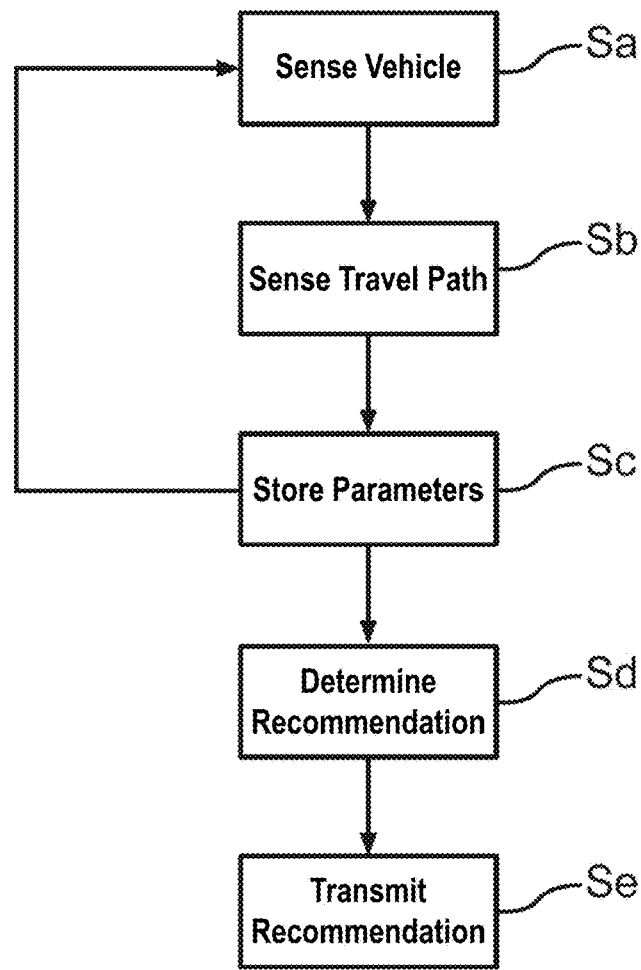
FIG. 1 shows a diagram depicting the method steps in a method for operating an electric charging device for an electrically drivable motor vehicle.
Figure 2:
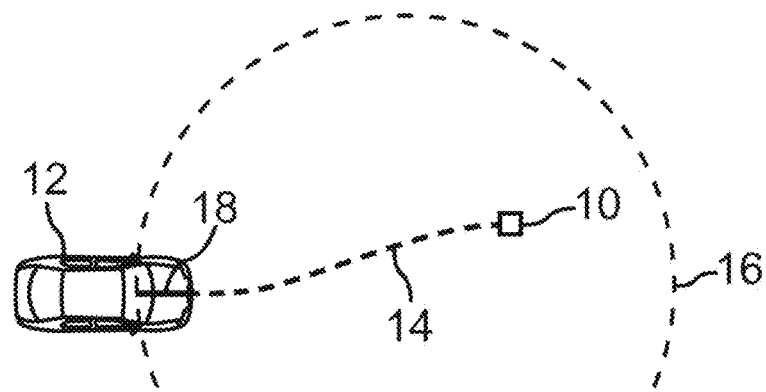
FIG. 2 shows a schematic depiction of a motor vehicle within a perimeter surrounding an electric charging device and an approach trajectory.

FIG. 1 shows a schematic diagram outlining the method steps for a method for operating an electric charging device for an electrically drivable motor vehicle. FIG. 2 shows a schematic depiction of a motor vehicle within a perimeter surrounding the electric charging device, along with an approach trajectory. In the following, the two figures will be discussed in detail together.

The electric charging device, which is not shown in the figures, comprises a ground unit 10, which is set into the ground, for example, and which comprises an inductive charging coil. A charging coil of a motor vehicle 12 in the immediate vicinity of the inductive charging coil can then charge the electrically drivable motor vehicle 12 in an inductive charging operation via an alternating electromagnetic field generated in the charging coils. For this purpose, the two charging coils must be positioned correctly one above the other and must not be spaced too far apart, so that the efficiency of the inductive charging operation will remain efficient.

Since a correct positioning of the motor vehicle 12 above the ground unit 10 with the charging coil may be dependent on only a few centimeters, driving the motor vehicle 12 onto the ground unit 10 is especially difficult. The electric charging device provides assistance with this by transmitting a driving recommendation with a recommended approach trajectory 14 to the motor vehicle 12. To determine the driving recommendation, in a first method step Sa a first motor vehicle 12 is sensed within a predefined perimeter 16 surrounding the ground unit 10 by the electric charging device. The predefined perimeter 16 extends in a radius of 5 to 8 meters around the ground unit 10, for example, and is depicted by way of example in FIG. 2. The motor vehicle 12 can be detected as soon as it crosses the predefined perimeter 16.

In a second method step Sb, the electric charging device senses a travel path of the motor vehicle 12, for example by means of suitable sensors. The travel path can be described, for example, by a series of driving parameters, each of which attains a driving parameter value measured by the electric charging device. For instance, the electric charging device can sense individually a driving speed of the motor vehicle 12, a steering angle of the motor vehicle 12, a driving direction of the motor vehicle 12, and/or a position of the motor vehicle 12 relative to the ground unit 10. These sensed driving parameters can then be combined to form an approach trajectory 14.

If the electric charging device detects that an electric charging operation is being carried out for the sensed motor vehicle 12, the sensed driving parameters and/or the approach trajectory 14 determined therefrom are stored in a memory of the electric charging device in a third method step Sc.

Method steps Sa, Sb, and Sc are repeated for each additional motor vehicle 12 detected within the predefined perimeter 16 surrounding the ground unit 10 by the electric charging device. Thus, a plurality of driving parameters and/or approach trajectories 14 traveled by the respective motor vehicles 12 from the predefined perimeter 16 to the ground unit 10 accumulate in the memory of the electric charging device.

In a fourth method step Sd, the electric charging device determines a driving recommendation with an ideal approach trajectory 14 to be recommended, on the basis of the approach trajectories 14 stored in the memory. For this purpose, each sensed approach trajectory 14 of the individual motor vehicles 12 can be evaluated, so that the ideal approach trajectory 14 to be recommended is determined only from those approach trajectories 14 that are rated as good. An approach trajectory 14 is rated as good, for example, if the motor vehicle 12 is driven particularly rapidly and/or in less than a predefined maximum time interval from a starting position within the perimeter 16 surrounding the ground unit 10 to a correctly positioned end position above the ground unit 10.

When another motor vehicle 12 is sensed within the perimeter 16 surrounding the ground unit 10 of the electric charging device, the electric charging device transmits the determined driving recommendation with the ideal approach trajectory 14 to be recommended in a fifth method step Se. The ideal approach trajectory 14 can also adapt to an approach route 18 of the motor vehicle 12 that has already begun, so that the recommended approach trajectory 14 has as its starting point the current position of the motor vehicle 12.

In the motor vehicle 12, the recommended approach trajectory 14 can be displayed dynamically on a screen, for example in the way in which a route is displayed in a navigation system. This allows the driver of the motor vehicle 12 to follow the recommended approach trajectory 14 and position himself correctly above the charging coil in the ground unit 10.

The examples taken together demonstrate how the disclosure can be used to operate an electric charging device to issue a recommendation to a motor vehicle of the best way to drive up to the electric charging device to ensure an efficient electric charging operation for the motor vehicle.

The invention claimed is:

1. A method for operating an electric charging device for an electrically drivable motor vehicle, comprising:
  (a) sensing a motor vehicle within a predefined perimeter surrounding a ground unit;
  (b) sensing, with a sensor system and at a plurality of respective time points, a plurality of driving parameter values, each of the plurality of driving parameter values corresponding to at least one driving parameter of the sensed motor vehicle;
(c) storing, in a memory unit of the electric charging device, the plurality of driving parameter values as an approach trajectory if an electric charging operation is carried out for the sensed motor vehicle;
(d) determining a driving recommendation based on the approach trajectories stored in the memory unit; and
(e) transmitting the driving recommendation when another motor vehicle is sensed within the predefined perimeter surrounding the ground unit,
wherein the electric charging device comprises the sensor system and a ground unit for positioning the electric charging device in a surface and for generating an alternating magnetic field for the electric charging operation, and
wherein the sensor system comprises a charging coil of the ground unit.

2. The method according to claim 1, wherein the driving recommendation is determined in view of a predefined criterion, the predefined criterion comprising an elapsed time between sensing of a respective motor vehicle and initiation of the electric charging operation of the respective motor vehicle.

3. The method according to claim 1, wherein two or more of the approach trajectories are averaged together to form the driving recommendation.

4. The method according to claim 1, wherein a radius of the predefined perimeter is greater than two meters.

5. The method according to claim 1, wherein the at least one driving parameter comprises at least one of: a driving speed, a steering angle, an acceleration, a braking, a driving direction of the respective motor vehicle, and/or a position of a respective motor vehicle relative to the ground unit.

6. The method according to claim 1, wherein the sensor system is decoupled from any sensors provided on the motor vehicle.

7. The method according to claim 1, wherein the motor vehicle is sensed based on at least one of a strength and an alignment of an electromagnetic field detected by the charging coil.

8. An electric charging device for an electrically drivable motor vehicle, comprising:
a sensor system,
a ground unit for positioning the electric charging device in a surface and for generating an alternating magnetic field for an electric charging operation,
a memory unit, and
a processor unit,
wherein the sensor system is configured to sense a motor vehicle within a predefined perimeter surrounding the ground unit,
wherein the sensor system is further configured to, at a plurality of respective time points, sense a plurality of driving parameter values, each of the plurality of driving parameter values corresponding to at least one driving parameter of the sensed motor vehicle,
wherein the electric charging device is configured to detect the electric charging operation for the sensed motor vehicle,
wherein, when the electric charging operation is detected, the plurality of driving parameter values are stored in the memory unit as an approach trajectory,
wherein the processor unit is configured to determine a driving recommendation based on the approach trajectories stored in the memory unit,
wherein the electric charging device is configured to transmit the driving recommendation when another motor vehicle is sensed within the predefined perimeter surrounding the ground unit, and
wherein the sensor system comprises a charging coil of the ground unit.

9. A motor vehicle configured to receive the driving recommendation from the electric charging device according to claim 8, the motor vehicle comprising:
an electric power storage device configured to be charged by the electric charging device, and
a display device for displaying the driving recommendation.

10. The electric charging device according to claim 8, wherein two or more of the approach trajectories are averaged together to form the driving recommendation.

11. The electric charging device according to claim 8, wherein the sensor system is decoupled from any sensors provided on the motor vehicle.

12. The electric charging device according to claim 8, wherein the motor vehicle is sensed based on at least one of a strength and an alignment of an electromagnetic field detected by the charging coil.

* * * * *